O. L. LEACH.
STORAGE BATTERY.
APPLICATION FILED APR. 24, 1918.
1,296,408.
Patented Mar. 4, 1919.
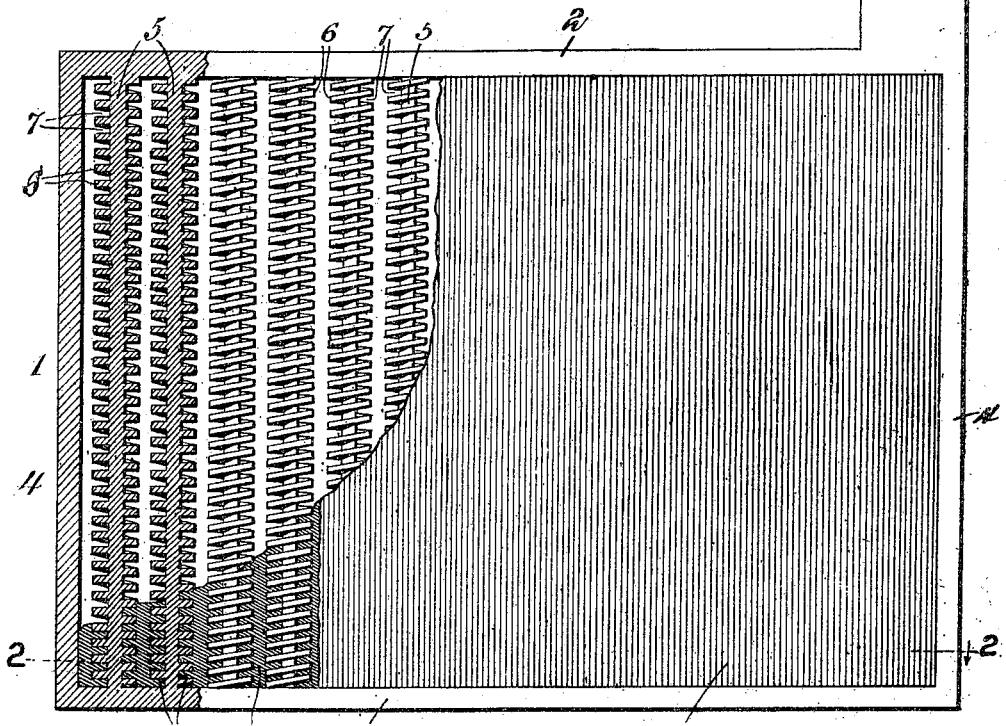
Orville L. Leach, INVENTOR,
WITNESSES
Howard D. Orr.
F. T. Chapman
BY C. G. Siggers.
ATTORNEY

UNITED STATES PATENT OFFICE.

ORVILLE LIVINGSTON LEACH, OF PROVIDENCE, RHODE ISLAND.

STORAGE BATTERY.

1,296,408.

Specification of Letters Patent.

Patented Mar. 4, 1919.

Application filed April 24, 1918. Serial No. 230,519.

*To all whom it may concern:*

Be it known that I, ORVILLE L. LEACH, a citizen of the United States, residing at Providence, in the county of Providence and State of Rhode Island, have invented a new and useful Storage Battery, of which the following is a specification.

This invention has reference to storage batteries and more particularly to the production of storage battery plates.

The object of the invention is to provide an especially strong plate resistant to various distorting forces liable to prove destructive to storage battery plates.

In accordance with the invention there is provided a grid of the material usually employed in storage batteries, and this grid is composed of a frame with spaced bars extending between and joining the top and bottom of the frame, these bars or posts each comprising a core with a helical groove having the turns relatively close together. The spaces between the turns are filled with active material, which may be extended so as to bridge the spaces between the bars. In either event the posts, except perhaps minute portions of the helices, are wholly inclosed in active material and in case the active material bridges the spaces between the posts the amount of exposed metal is reduced to a negligible minimum.

A storage battery plate constructed in accordance with the invention is highly advantageous in several particulars which will be hereinafter referred to.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Figure 1 is an elevation of a storage battery plate constructed in accordance with the invention, with some portions of the active material broken away and in section and certain portions of the grid also in section.

Fig. 2 is a section on the line 2—2 of Fig. 1.

Fig. 3 is a fragmentary section similar to Fig. 2, but illustrating a different arrangement of the applied active material.

Fig. 4 is a section similar to Fig. 3, but showing still another arrangement of the active material.

Referring to the drawings, there is shown a grid 1 composed of a main frame made up of top and bottom bars 2 and 3 respectively, and end bars 4. The top and bottom bars are joined by a series of posts 5, each provided with a helical flange or web 6 of flat cross section, the grid being formed of lead, as is customary.

The turns of the flange 6 are relatively close together, being shown in the drawings as spaced apart lengthwise of the post by distances about equal to the thickness of the flanges, but it is to be understood that such particular spacing is not obligatory. The spacing of the turns of the flange provide a continuous helical groove 7 from one end of the post to the other and in the finished plate these are filled with active material 8 which may extend only to the outer edge of the groove, as in Fig. 4, or may bridge the spaces between posts, as indicated at 9 in Figs. 1, 2 and 3. Where a larger surface of active material is desired than is provided in the arrangement of Figs. 1 and 2, the bridging portions 9 may be grooved or concaved on the outer face, as indicated at 10 in Fig. 3, thereby forming a wavy or corrugated face for the plate.

The invention has nothing to do with the active material employed which is customarily an oxid of lead when first applied, that is, red lead for the positive plates and litharge or yellow lead for the negative plates. When the elements are assembled in the form of a battery the usual wooden sheets may be employed as insulators and separators, while the cells or jars are made of hard rubber or glass or other suitable material.

The grids may be cast or molded, but because such cast or molded grids are more crystalline than a rolled or struck-up grid and consequently more susceptible to electrolytic action, it is preferred to employ the rolled or struck-up form of grid, since it is more economical of production, saves junking of the plates and is an easier and cleaner process than the cast process.

Moreover, the active material may be easier and more firmly rolled or pressed into the grid than is the case with other forms of grids, and when in place will stand sulfating, swelling and other distorting forces to a far better degree than storage battery plates as ordinarily produced.

The posts are placed as close together as they may conveniently be placed without the helical flanges or webs touching. Moreover, when the oxid bridges the spaces between the posts the whole plate is strengthened thereby. The post with the helical rib or web is effectively as strong as a solid or hollow post of the same external diameter, but has the advantage of holding a substantial quantity of active material in the continuous helical groove extending from end to end of the post. Such material when swelling simply travels lengthwise of the groove and when contracting will return to its initial position without liability of the active material breaking down or being forced away from the support so as to be lost.

Moreover, when standing idle, a battery constructed in accordance with the invention is not subject to stagnation of the electrolyte and consequent irregular sulfating. Where the posts are separated, as in Fig. 4, or the surface is corrugated or wavy as in Fig. 3, there is plenty of space for the electrolyte to circulate by the intermolecular motion of the electrolyte. All these conditions contribute to the resistance of the grid to distortion when the battery is being charged.

In airplanes it is demanded that the grids be made very thin in order to get quick action, the thickness being not more than one-sixty-fourth of an inch. Grids of ordinary type soon break down if made so thin, but with the grid of this invention excellent service is obtainable even with such extreme thinness, while a relatively large surface is obtainable with extreme light weight in the corrugated or wavy surface form, shown in Fig. 3.

What is claimed is:—

1. A storage battery grid, comprising a border frame with interior posts each composed of a central core with a helical flange or web of short pitch outstanding therefrom and extending from one end to the other, the frame, posts and webs being all made of lead, and the spaces between the turns of the flange or web constituting a continuous receptacle for active material.

2. A storage battery plate, comprising a grid consisting of a border frame with top, bottom and end bars and posts joining the top and bottom bars and each formed of a central core with an outstanding helical flange or web of short pitch extending from end to end of the post to provide a continuous helical pocket; and active material lodged in each pocket and continued from post to post filling the spaces between the posts with active material, and the opposite faces of the plate being grooved to provide a wavy or corrugated surface.

3. A storage battery plate, comprising a grid with posts each comprising a core with an exterior helical flange or web, and active material filling the spaces between the turns of the webs and between neighboring posts, the material between the posts being reduced in thickness to produce grooves imparting a wavy, or corrugated form to the opposite faces of the plate.

In testimony, that I claim the foregoing as my own, I have hereto affixed my signature.

ORVILLE LIVINGSTON LEACH.

Witnesses:
JOHN BAGLY, Jr.,
PHILIP P. STREETER.